(12) United States Patent
D'Athis et al.

(10) Patent No.: US 8,719,570 B2
(45) Date of Patent: May 6, 2014

(54) MOBILE TERMINAL FOR SECURE ELECTRONIC TRANSACTIONS AND SECURE ELECTRONIC TRANSACTION SYSTEM

(75) Inventors: Thierry D'Athis, Versailles (FR); Philippe Dailly, Etrechy (FR); Pascal Morin, Palaiseau (FR); Denis Ratier, Draveil (FR)

(73) Assignee: Thales, Neuilly-sur-Seine (FR)

( * ) Notice: Subject to any disclaimer, the term of this patent is extended or adjusted under 35 U.S.C. 154(b) by 1239 days.

(21) Appl. No.: 11/912,933

(22) PCT Filed: Apr. 28, 2006

(86) PCT No.: PCT/EP2006/061944
§ 371 (c)(1),
(2), (4) Date: Jul. 29, 2008

(87) PCT Pub. No.: WO2006/117351
PCT Pub. Date: Nov. 9, 2006

(65) Prior Publication Data
US 2008/0294898 A1 Nov. 27, 2008

(30) Foreign Application Priority Data

Apr. 29, 2005 (FR) ..................................... 05 04389

(51) Int. Cl.
*H04L 29/06* (2006.01)
(52) U.S. Cl.
USPC ........... 713/169; 713/150; 380/278; 380/279; 705/67; 705/73; 705/75
(58) Field of Classification Search
USPC ............. 713/150, 169; 380/278, 279; 705/67, 705/73, 75
See application file for complete search history.

(56) References Cited

U.S. PATENT DOCUMENTS

| | | | |
|---|---|---|---|
| 2002/0031229 A1 | 3/2002 | Yamamoto | |
| 2003/0065528 A1 | 4/2003 | Matsumoto | |
| 2003/0088780 A1 | 5/2003 | Kuo et al. | |
| 2005/0033962 A1 * | 2/2005 | Libin et al. | ..................... 713/170 |
| 2006/0153380 A1 * | 7/2006 | Gertner | ......................... 380/221 |

FOREIGN PATENT DOCUMENTS

WO    WO 03107583 A1 * 12/2003   ........... G06K 19/073

OTHER PUBLICATIONS

Walter T et al: "Secure Mobile Business Applications—Framework, Architecture and Implementation"; Information Security Technical Report, Elsevier Advanced Technology, vol. 9, No. 4, (Dec. 2004), p. 6-21, XP004725489; ISSN: 1363-4127.

* cited by examiner

*Primary Examiner* — Justin T Darrow
(74) *Attorney, Agent, or Firm* — Lowe Hauptman & Ham, LLP

(57) ABSTRACT

The present invention relates to a roaming electronic transaction terminal. It also relates to a secure system for electronic transactions comprising one or more roaming terminals. The terminal (1) has an application package support (2) and a coupler (3) for carrying out the read and write operations on a medium that are required for the electronic transactions in conjunction with the application package. The coupler (3) comprises means for creating a write time window and a read time window on the basis of a secure input signal, all writing and all reading being disabled outside of the corresponding windows. The invention applies notably for the securing of terminals carrying out checks and contractual transactions on supports equipped with processors and memories, it being possible for these supports to be through contactless read and write cards comprising for example transport entitlements, payment means or any other entitlements to be turned to account.

16 Claims, 2 Drawing Sheets

MOBILE TERMINAL FOR SECURE ELECTRONIC TRANSACTIONS AND SECURE ELECTRONIC TRANSACTION SYSTEM

CROSS-REFERENCE TO RELATED APPLICATIONS

The present application is based on International Application No. PCT/EP2006/061944, filed on Apr. 28, 2006, which in turn corresponds to France Application No. 05 04378 filed on Apr. 29, 2005, and priority is hereby claimed under 35 USC §119 based on these application. Each of these applications are hereby incorporated by reference in their entirety into the present application.

FIELD OF THE INVENTION

The present invention relates to a roaming electronic transaction terminal. It also relates to a secure system for electronic transactions comprising one or more roaming terminals. The invention applies notably for the securing of terminals carrying out checks and contractual transactions on supports equipped with memories, it being possible for these supports to be through contactless read and write cards comprising for example transport entitlements, payment means or any other entitlements to be turned to account.

BACKGROUND OF THE INVENTION

An example of electronic transactions using contactless cards relates to transport entitlements. These cards allow users to access means of transport by passing the former across readers placed at the entry points of stations or on entry to vehicles. The entitlements are realized and stored in the memory of the cards. Just as for conventional means, of the type for example of the orange cards in the Paris region, the entitlements stored in the cards correspond to various types of subscription or contracts as a function notably of the geographical area covered, the capacity of the user and the duration. Checking the validity of a subscription requires particular means contrary to a conventional paper entitlement where the characteristics of the subscription are visible. Notably, electronic reading means making it possible to read the content of the contract stored in a card are required. The agents in charge of checking transport entitlements must therefore be permanently equipped with apparatus for reading electronic supports such as memory cards for example.

These agents, the inspectors, must also have the capability of issuing transport entitlements or of modifying the contracts, for example the subscriptions. Their apparatuses must therefore also be capable of reading and writing the data registered in the memory of the cards.

These reading and writing apparatuses can also be used in fixed points of sale for example at newsagents that are authorized to issue transport entitlements. In particular the users must be able to reload their cards in these fixed points of sale.

The problem of security arises in regard to agents or points of sale, at newsagents for example. It is necessary in particular to prevent the utilization of electronic transactions in the event of theft of these reading and writing terminals which are generally of roaming type, be they carried by agents or installed in points of sale.

SUMMARY OF THE INVENTION

An aim of the invention is notably to prevent any malicious or fraudulent use of an electronic transaction terminal. For this purpose, the subject of the invention is a roaming electronic transaction terminal comprising an application package support and a coupler for carrying out the read and write operations on a medium that are required for the electronic transactions in conjunction with the application package. The coupler comprises means for creating a write time window and a read time window on the basis of a secure input signal, all writing and all reading being disabled outside of the corresponding windows.

In a particular embodiment, the coupler comprises a clock, a first register for counting the time of the read time window and a second register for counting the time of the write time window, the registers being initialized as a function of the secure signal. The value of the first register is compared with a first value REG_R defining the read time window and the value of the second register is compared with a second value REG_W defining the write time value, reading being disabled when the value of the first register reaches the first value REG_R and writing being disabled when the value of the second register reaches the second value REG_W.

Advantageously, the read time window and the write time window have different values. The write time window is for example less than the read time window.

The exchanges with the coupler are done for example according to two channels:
- the coupler and the application package support communicate with one another through a confidential link;
- the coupler communicates with an exterior checking facility (5) through a secure link; the key Kv that makes it possible to open the confidential session being generated by the coupler, the opening of a confidential session being carried out by mutual identification by means of the key Kv. Advantageously, this key Kv is provided to the application package support by way of the exterior checking facility.

The link between the coupler and the checking facility passes for example through the application package support which comprises a routing program for routing the data from the coupler to the checking facility.

The secure signal giving rise to the initialization of the write and read time windows is for example generated by the opening of a communication session between the coupler and the checking facility. A time window can for example be initialized by a coded signal input on the application package support. Advantageously, only the write time window can be initialized by a signal input on the application package support.

Advantageously, the application package support and the coupler each comprise for example a log of the electronic transactions performed in a given period, the logs being dispatched to a checking facility which performs a reconciliation of the logs, a reconciliation defect revealing a missing or falsified transaction.

The invention also relates to a secure system for electronic transactions composed of a checking facility and of one or more terminals such as that previously described. Advantageously, the checking facility and the coupler communicates in the form of a secure session by mutual authentication based on a key contained in the checking facility and in the coupler.

The main advantages of the invention are that it secures the use of a roaming electronic transaction terminal, that it makes it possible to detect the loading of fraudulent data or software onto this type of terminal and to prevent the use thereof, and that it is suited to all types of electronic transaction applications.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all with out departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
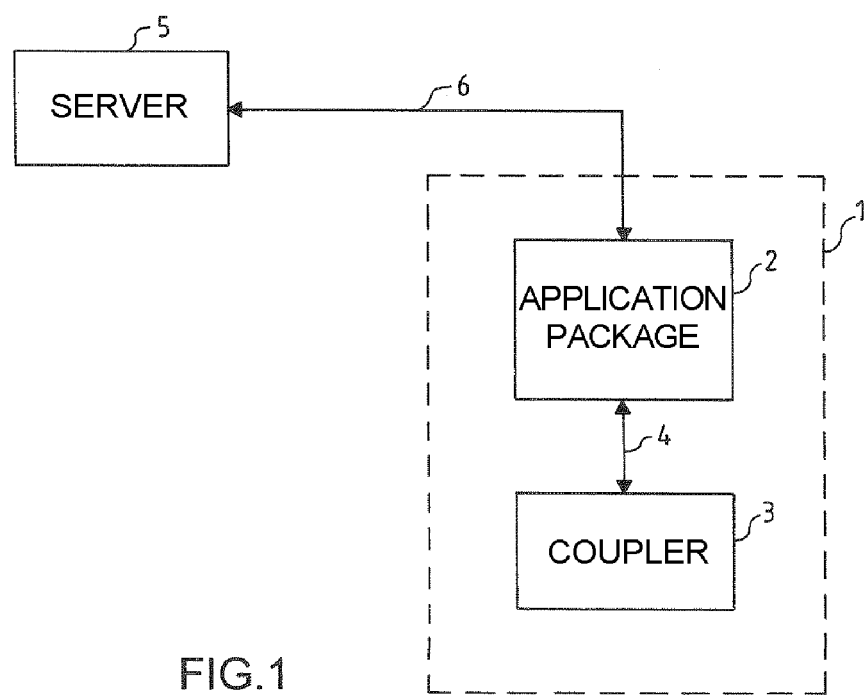
FIG. 1, through a schematic an electronic transaction terminal according to the invention.

FIG. 1 presents through a schematic a roaming electronic transaction terminal according to the invention. The terminal 1 comprises an application package support 2 and a coupler 3. The support 2 and the coupler 3 exchange data through a link 4. The terminal can dialog with a server 5 through a link 6. The application package carried by the support 2 processes for example an entire ticketing application, going for example from the checking of entitlements to the issuing of entitlements and to the generation or modification of subscription contracts. The support 2 is for example of the pocket computer type more commonly called a PDA. The coupler 3 comprises notably the function of reading the content of an electronic support and/or the function of writing to this same support. This electronic support is for example a contactless intelligent card with read and write capability. The coupler is not dedicated as such to a particular application, it is a simple read and write peripheral for a contactless card for example.

Subsequently in the description and by way of example reference will be made to a ticketing application. The coupler 3 will be called the ticketing coupler and will be intended to perform reading and writing operations on contactless cards, the latter comprising the entitlements checked or issued by the application. Still within the framework of an exemplary application, the entitlements in question will be transport entitlements and the application support will be of the PDA type carried by an agent. When he is on an assignment, this agent will therefore be equipped with the PDA 2 and the ticketing coupler 3.

Figure 2:
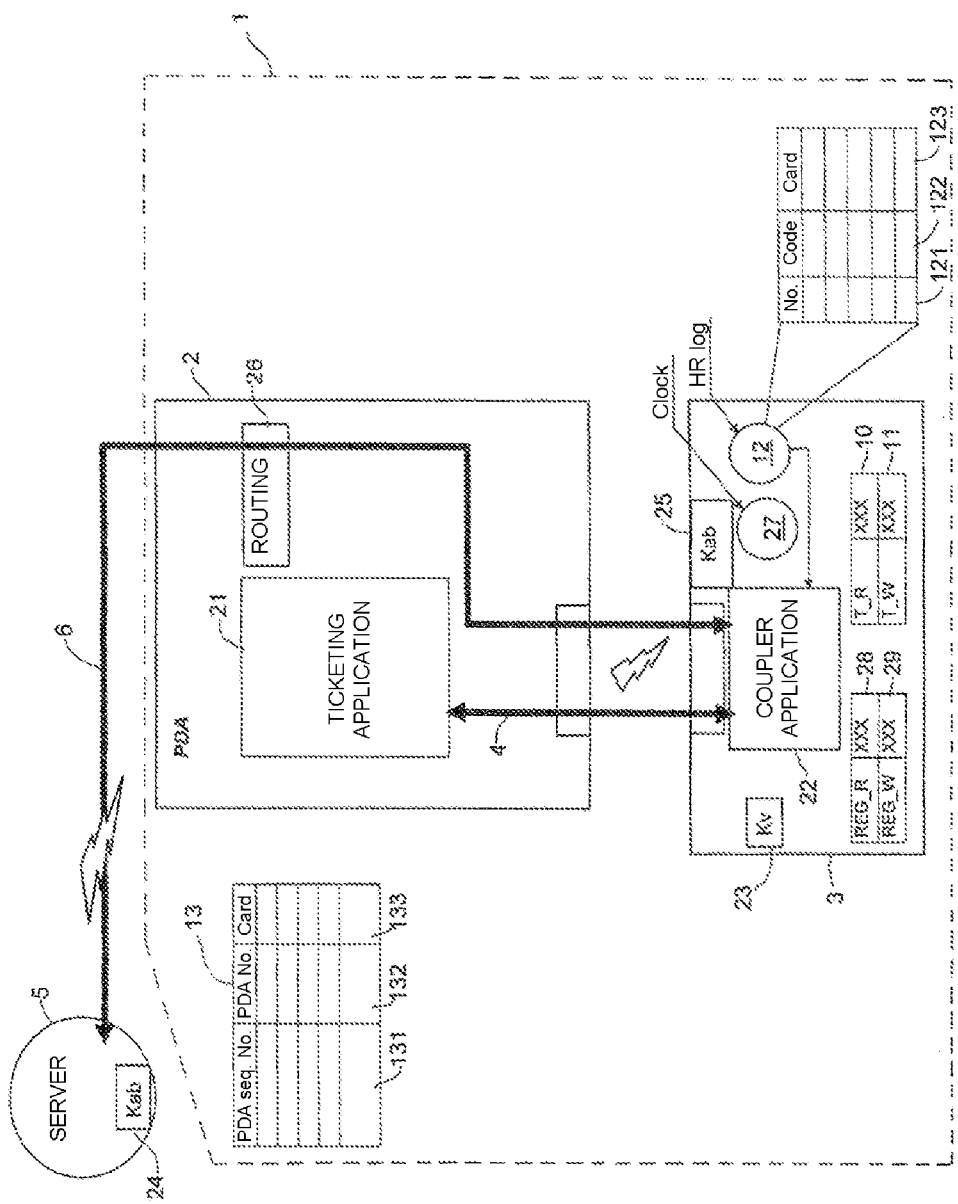
FIG. 2, an illustration of a possible embodiment of a system and of a terminal according to the invention.

FIG. 2 presents by a more detailed schematic an exemplary embodiment of a terminal 1 according to the invention. The terminal 1 is an apparatus for checking and selling realized transport entitlements, stored on cards with contactless reading. It comprises a PDA 2 and a ticketing coupler 3. The PDA 2 comprises the ticketing application program 21. This application handles for example the checking of the transport entitlements stored in the contactless cards as well as the issuing of entitlements. It also handles subscription contract modifications or renewals. An entitlement check is done through a card reading operation. An entitlement or contract modification/renewal is issued through an operation of reading and writing on the card. The nature and the duration of a subscription are stored on a card through a write operation. To determine the price to be payed by the user a read operation may be necessary to verify the user's characteristics, his rights to a reduction for example. To handle all the ticketing operations the application package 21 contained in the PDA stores for example all the types of contracts by types of user, by durations, by geographical areas, by transport means etc.

The PDA exchange data with the coupler 3 through a link 4. This link can be wireless, of the "bluetooth" type for example. On initialization, the application or a part of the ticketing application is loaded into the coupler through this link 4 into a memory space 22 envisaged for this purpose. The terminal 1 additionally comprises a link 6 with a server 5.

The link 4 between the PDA 2 and the coupler 3 therefore allows exchange of data between these two elements. The confidentiality of the exchanges between the coupler and the PDA is ensured by a key Kv which serves for mutual identification. The key Kv serves for mutual identification for example through exchange of randomly drawn keys. It is for example changed regularly on the initiative of the coupler or PDA. In one mode of operation, this key Kv is for example renewed randomly by the coupler and provided to the PDA. Thus, a key $Kv_{i+1}$ is for example dispatched to the PDA enciphered with the previous session key $Kv_i$. For this purpose, the coupler 3 comprises a program 23 for managing this key Kv, notably for random generation of the various keys $Kv_i$, of which it is composed. The PDA not being supposed reliable, this key is simply confidential.

The coupler 3 is the secure element of the roaming terminal 1. It comprises for example a ticketing application for reading and writing entitlements, the ticketing processing being implemented additionally by PDA. Only the coupler 3 can execute the operations for reading and writing contactless cards that are necessary for the electronic ticketing transactions.

The link 6 between the terminal 1 and the server 5 allows notably the exchanging of data between the coupler 3 and the server 5. The connection between the coupler and the server is for example secured by mutual authentication based on keys Kab 24, 25 contained in the server 5 and in the coupler 3. The authentication complies for example with the ISO 9798-2 protocol. The coupler and the server being supposed reliable, these keys are secret. The PDA 2 can serve as communication relay between the coupler and the server. It comprises for example for this purpose a routing program 26. The exchanges that it routes by way of this program 26 are therefore encrypted by the key Kab and are therefore known only to the ends of the chain, namely the coupler 3 and the server 5.

The coupler 3 is considered to be a peripheral from the ticketing point of view. However it is not as such dedicated to a ticketing application. The application depends notably on the software loaded into the memory 22 of the coupler dedicated to the application. It is possible to load all types of application, in particular other than ticketing.

The electronic transactions are done with the coupler. It acts as read and write peripheral. Specifically it reads the cards and writes to the cards that are necessary for the ticketing application, while the PDA processes these ticketing applications in particular it performs the processing of the transport entitlements such as sales or issuing of entitlements or sales or modifications of subscriptions for example.

The coupler communicates with the PDA and with the server. Its links with the exterior are therefore made through two channels:
  in the form of a secure session through the key Kab with the server 5 via the coupler-server link 6;
  in the form of a confidential session through the key Kv with the PDA 2 via the coupler-PDA link.

The confidential session prevents a coupler that is not paired with a PDA from being operated. The confidential session is established across the link 4 between the coupler and the PDA. If the PDA does not know the key Kv generated by the coupler 3, the opening of sessions between the PDA and the coupler is not possible. The two elements 2, 3 cannot be paired and the terminal 1 does not operate.

The secure session 6 is notably the only one which makes it possible to reload the internal data necessary for the operation of the coupler, that is to say notably the application package. It makes it possible therefore to load the application software 22 specific to the coupler, in the case of the example of FIG. 2, and the other necessary internal data. Through this secure session, the server 5 also makes it possible to pair the coupler and the PDA by providing the confidential key Kv to the PDA, when the coupler gives it the key under session secured by key Kab. In particular in the case where the PDA has lost its key Kv, the means of retrieving it is to connect to the server in a manner that is made secure through the coupler-server link 6. This holds notably in the case of the first initialization where the server reloads the key Kv into the PDA after having taken cognizance thereof on the part of the coupler under secure session obtained with the key Kab.

This secure session also makes it possible to open an operating time window for the coupler.

In particular, the coupler 3 comprises a real time clock 27 and registers for storing values of read time windows 10 and write time windows 11. The coupler 3 also comprises temporal registers 28, 29 associated with the clock 27 for measuring time intervals. More particularly a first temporal register 28 is allotted to the counting of the time of the read time window and a second temporal register 29 is allotted to the counting of the time of the write time window. The clock and its associated registers 28, 29 work even when no voltage is applied. When the link is established between the server 5 and the coupler 3 by mutual authentication, the registers 28, 29 are initialized to the value of the clock 27, equal to REG H. For this purpose the clock 27 is for example a counter incremented by edges of a quartz oscillator. When operational, the coupler compares the value REG_R and REG_W of these registers 28, 29 with the data the value REG_H of the clock 27 plus respectively T_R and T_W recorded in the registers 10, 11. These data T_R and T_W respectively define the value of the read time opening and of the write time opening. When the value REG_W of the register 29 dedicated to writing exceeds for example the value REG_H+T_W the coupler is write disabled. It can then no longer execute subscription or ticket sale operations, or else contract modification operations for example. When the value REG_R of the register 28 dedicated to reading exceeds for example the value REG_H+T_R the coupler is read disabled. It can then no longer execute checking operations. T_W can for example be fixed at a day and T_R can for example be fixed at a week.

Figure 3:
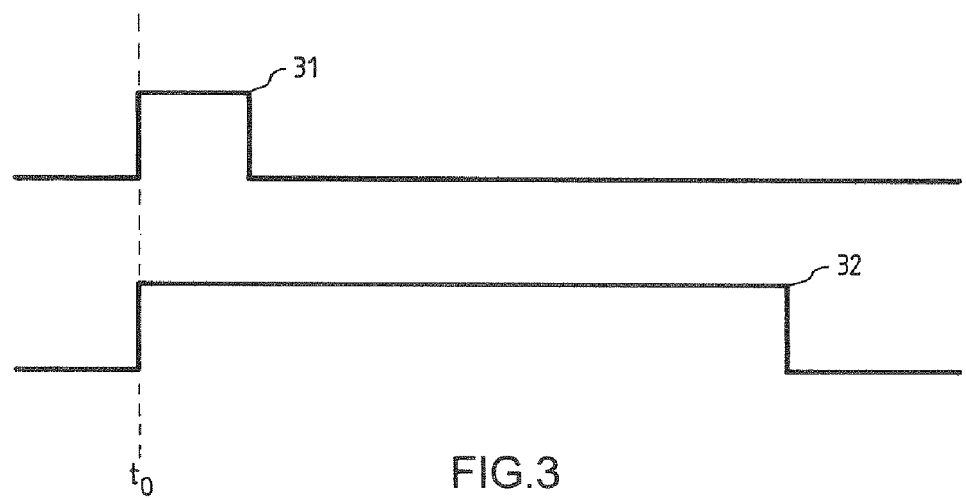
FIG. 3, an example of relative durations of a write time window and of a read time window.

FIG. 3 illustrates through two timecharts an exemplary time window 31 for writing and an exemplary time window 32 for reading. By virtue of the clock 27 the coupler stores the instant of the last initialization of the temporal registers 28, 29. This initialization is performed at an instant $t_0$ during a communication established with the server 5. On the occasion of this initialization, the server can also modify the values of the registers 10, 11 defining the time windows. In fact, during a communication session with the server 5, the following data can be reloaded:

application software, for example ticketing software;
the values T_R and T_W of the durations of the read and write time windows.

Thus upon the establishment of a communication by mutual authentication between the server 5 and the coupler 3, a write time window is initialized and a read window is initialized. Beyond the first window any write operation is impossible and beyond the second window any read operation is impossible. An agent can thus connect the coupler 3 to the server 5 at the start of an assignment for example. Then he disconnects and goes off to his assignment. If his terminal 1 is stolen or lost, the ticket or subscription contract sales operations will not be able to exceed 24 hours counting from the initialization connection to the server. Likewise beyond a week any read operation will be impossible. These durations of read and write time windows can of course be parametrized as a function of the type of assignment.

In the example of FIG. 3 the durations of the time windows do not have the same duration for writing and reading. For certain applications these windows could be of the same durations. An advantage afforded by different window durations 31, 32 is flexibility of use. The case of an agent checking and issuing transport entitlements illustrates notably this advantage. At the instant to the agent connects his terminal 1 to the server. More particularly the coupler 3 enters into communication with the server 5. The time window for writing is then open for example for a duration of 24 hours and the time window for reading is then open for a duration of a week. In this case it is possible to envisage the capability of resetting the temporal register 29 envisaged for the write time window a certain number of times without direct connection to the server. The agent can then telephone a service which obtains a code for him for resetting this temporal register 29, the time window being reinitialized for 24 hours. The operation can be repeated over a week, the duration for which the read time window 32 is open. This window 32 requires a connection to the server 5 so as to be reinitialized. Advantageously, an agent who lives far away from the place where the server 5 is stored does not need to travel every day to reinitialize the time window for writing at the server or in proximity. Beyond a week any use of the terminal is nevertheless impossible since the time window for reading is closed and it can only be reactivated by a connection by mutual authentication to the server. In case of malfunction of the clock or the temporal registers, a system is for example designed to disable the operation of the coupler. In the exemplary embodiment of FIG. 2 the initialization of the write 31 and read 32 time windows is done through a secure connection to the server 5. Thus in this case, the initializations of the time windows are done through a secure signal originating from a server or from any other exterior facility. However it is possible to envisage another initialization mode, operating for example in parallel. This secure signal can also be entered in the form of a code input by an agent or a user to the coupler, notably and in an advantageous manner for opening the write window 31.

The coupler 3 comprises for example additionally a register 12 which comprises the log of the transactions performed by the coupler 3 during a given period limited or otherwise. Said register stores in this log 12 all the cards that it has processed. In particular for each transaction it can store a sequence number 121, an operation code 122 and a physical number of the card 123 or any other code for identifying the card. This log is dispatched by secure session to the server 5, for example each time the coupler is placed in communication by mutual authentication with the server. As indicated previously the secure session can be effected through the link 6 between the coupler and the server through the use of the key Kab.

The PDA 2 likewise comprises a log of the transactions 13 during a given period, limited or otherwise. It involves the transactions performed by PDA itself. The transactions held in this log are stored at each transaction performed by the PDA 2. The log 13 of the PDA comprises for each stored transaction the sequence number 131 seen from the PDA, the number 132 of the PDA or any other identifier of the latter and the physical number 133 of the card which is the subject of the transaction or any other code making it possible to identify this card. The identifier of the card is dispatched by the coupler via the link 4. The transactions stored by the PDA correspond to the transactions stored by the coupler.

The logs 12, 13 comprise for example the instant of each transaction, the instant being for example provided by the clock 27 of the coupler 3. The log 13 can be dispatched regularly to the server 5, for example by way of the link 6 between the coupler 3 and the server 5 which passes through the PDA. The log 13 of the PDA can also be dispatched by any other means to the server, for example by telephone link or by network.

The server thus has the two logs of the transactions, the log 12 stored by the coupler and the log 13 stored by the PDA. Theoretically these logs relate to the same transactions. The server can thus comprise a function for comparing these two logs 12, 13. Advantageously these two logs afford a degree of additional security to the terminal 1. In particular, this security makes it possible to detect fraudulent transactions. A difference between the two logs, for example a transaction missing from the log 13 of the PDA indicates a fraud. This fraud can be due for example to a fraudulent sale stored in the log 12 of the coupler but not stored in the PDA log 13, or vice versa. It is thus possible to detect and identify transactions deleted or modified by a malicious agent or user.

Thus, the server 5 can correlate the data of the transactions that it receives from the PDA 2, which are unreliable, with the data of the transactions, safe, that it receives from the coupler 3 in the form of a log. Its monitoring role extends to other terminals. It verifies notably that what has been validated has indeed been sold and what has been sold has indeed been payed for. It makes it possible to pair a coupler with a PDA by providing the confidential key Kv to the PDA when the coupler gives it the key in a session made secure by the key Kab. A system composed of the server 5 and of one or more roaming electronic transaction terminals such as that previously presented then forms a secure system for electronic transactions.

The server 5 is the only element of the system which makes it possible to reload the coupler since it is the only one to know the key Kab. The logs 12, 13 could be dispatched to checking facilities other than the server 5 to perform their reconciliation, with the appropriate links. This checking facility 5 performs a reconciliation of the transactions stored in the log 12 of the coupler 3 and those stored in the log 13 of the PDA 2. A reconciliation defect, that is to say a transaction present in one register and not in the other, indicates an erroneous transaction, fraudulent or not. An exemplary reconciliation is the comparison performed on the aforesaid data 121, 122, 123, 131, 132, 133 of the logs 12, 13. Other types of reconciliations of the transactions stored in these logs 12, 13 are possible.

The invention has been presented with regard to a ticketing application, more particularly to the processing of transport entitlements by a roaming terminal. It can of course be applied to other sectors and more generally to other types of electronic transactions calling upon a roaming terminal requiring a certain security level. Additionally the medium used in the exemplary application is a contactless read and write card. It is obviously possible to use other types of medium. Likewise the application package support 2 has been described as being a PDA. It is possible to use other types of application package supports, for example a portable computer, a portable telephone or any other type of man-machine interface capable of connecting to a server 5 and to a coupler 3. The link 6 between the coupler 3 and the server 5 and the link 4 between the coupler and the PDA have been described as being wireless links, for example of bluetooth type. These links have the advantage of rendering the use of the PDA more practical. Other types of links can be used.

Finally the application package support 2 and the coupler 3 have been presented as two components having different physical supports. In another embodiment, the application package support 2 and the coupler 3 could be placed on one and the same physical support. Nevertheless the separation of the application package support 1 and of the coupler 3, that is to say the fact of communicating through a confidential link 4, affords an additional security element. In particular the server 5 or any other exterior checking facility makes it possible only to pair a coupler 3 and an application package support 2. Specifically the key Kv for example which makes it possible to open the communication sessions between the application package support 2 and the coupler 3 is provided by the server 5 to the coupler through a secure link, by means of the key Kab for example. The coupler thereafter transmits this key Kv to the application package support 2. As was indicated previously this key can be renewed, for example in a random manner.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A roaming electronic transaction terminal, comprising:
   an application package support; and
   a coupler for carrying out read and write operations on a medium required for electronic transactions in conjunction with the application package support, and for creating a write time window and a read time window based on a secure input signal, all writing and all reading being disabled outside of the corresponding time windows, wherein
   the read time window and the write time window have different values,
   the coupler is configured to communicate with an exterior checking facility, and
   the secure input signal giving rise to the initialization of the write and read time windows is configured to be generated by an opening of a communication session between the coupler and the exterior checking facility.

2. The terminal as claimed in claim 1, wherein the write time window is included in the read time window.

3. The terminal as claimed in claim 1, wherein:
   the coupler and the application package support communicate with one another through a confidential link;
   the coupler communicates with the exterior checking facility through a secure link;
   a key (Kv) that makes it possible to open the confidential session being generated by the coupler, the opening of a confidential session being carried out by mutual identification by means of the key (Kv), this key (Kv) being provided to the application package support by way of the exterior checking facility.

4. The terminal as claimed in claim 3, wherein the secure link between the coupler and the exterior checking facility passes through the application package support which comprises a routing program for routing the data from the coupler to the checking facility.

5. The terminal as claimed in claim 1, wherein the application package support and the coupler each comprise a log of the electronic transactions performed in a given period, the logs being dispatched to the checking facility which is configured to perform a reconciliation of the logs, a reconciliation defect revealing an erroneous transaction.

6. The terminal as claimed in claim 5, wherein the checking facility is a server.

7. The terminal as claimed in claim 1, wherein the application package support is a personal digital assistant (PDA).

8. The terminal as claimed in claim 1, wherein the application package support comprises a ticketing processing application.

9. The terminal as claimed in claim 1, wherein the medium is a contactless read card.

10. A system for electronic transactions comprising:
the exterior checking facility and at least one terminal as claimed in claim 1.

11. The system as claimed in claim 10, wherein the exterior checking facility and the coupler communicates in the form of a secure session by mutual authentication based on a key (Kab) contained in the checking facility and in the coupler.

12. The terminal as claimed in claim 3, wherein a time window is initialized by a coded signal input on the application package support and transmitted to the coupler.

13. The terminal as claimed in claim 3, wherein the application package support and the coupler each comprise a log of the electronic transactions performed in a given period, the logs being dispatched to the exterior checking facility which is configured to perform a reconciliation of the logs, a reconciliation defect revealing an erroneous transaction.

14. A roaming electronic transaction terminal, comprising:
an application package support; and
a coupler for carrying out read and write operations on a medium required for electronic transactions in conjunction with the application package support, and for creating a write time window and a read time window based on a secure input signal, all writing and all reading being disabled outside of the corresponding time windows, wherein
the read time window and the write time window have different values,
the coupler further includes
a clock,
a first register for fixing the read time window and a second register for fixing the write time window, the registers being initialized as a function of the secure input signal, and
the read time window begins at an instant REG_R of the first register and lasts a duration T_R stored in a register,
the write time window begins at an instant REG_W of the second register and lasts a duration T_W stored in a register,
reading is disabled when the value of the clock reaches the value REG_R increased by the duration T_R, and
writing is disabled when the value of the clock reaches the value REG_W increased by the duration T_W, and
one of the write time window and the read time window is configured to be initialized by a coded signal input that is on the application package support and is configured to be transmitted to the coupler from an exterior checking facility.

15. The terminal as claimed in claim 14, wherein only the write time window is configured to be initialized by the coded signal input on the application package support and transmitted to the coupler from an exterior checking facility.

16. The terminal as claimed in claim 14, wherein:
the coupler and the application package support are configured to communicate with one another through a confidential link;
the coupler is configured to communicate with the exterior checking facility through a secure link;
a key (Kv) that makes it possible to open the confidential session being generated by the coupler, the opening of a confidential session being carried out by mutual identification by means of the key (Kv), this key (Kv) being provided to the application package support by way of the exterior checking facility.

* * * * *